United States Patent
Burgess et al.

(10) Patent No.: US 10,845,207 B2
(45) Date of Patent: Nov. 24, 2020

(54) NAVIGATION BASED ON REGIONAL NAVIGATION RESTRICTIONS

(71) Applicant: VERIZON PATENT AND LICENSING INC., Basking Ridge, NJ (US)

(72) Inventors: Elizabeth A. Burgess, Toronto (CA); Peter J. Lear, Hamilton (CA); Victor J. Rehorst, Whitby (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 353 days.

(21) Appl. No.: 15/874,312

(22) Filed: Jan. 18, 2018

(65) Prior Publication Data
US 2019/0219410 A1    Jul. 18, 2019

(51) Int. Cl.
*G01C 21/34* (2006.01)
*G08G 1/00* (2006.01)

(52) U.S. Cl.
CPC ..... *G01C 21/3461* (2013.01); *G01C 21/3469* (2013.01); *G08G 1/207* (2013.01)

(58) Field of Classification Search
CPC ........... G01C 21/3461; G01C 21/3469; G08G 1/207
See application file for complete search history.

(56) References Cited

U.S. PATENT DOCUMENTS

| | | | |
|---|---|---|---|
| 6,262,741 B1* | 7/2001 | Davies | G06T 17/05 345/423 |
| 6,470,266 B1* | 10/2002 | Ito | G01C 21/3626 340/990 |
| 6,529,722 B1* | 3/2003 | Heinrich | H04M 11/04 455/404.1 |
| 6,993,430 B1* | 1/2006 | Bellesfield | G01C 21/3679 340/995.14 |
| 2007/0225900 A1* | 9/2007 | Kropp | G01C 21/3461 701/418 |
| 2008/0162034 A1* | 7/2008 | Breen | G01C 21/26 701/533 |
| 2010/0292914 A1* | 11/2010 | Vepsalainen | G01C 21/3453 701/532 |
| 2011/0225194 A1* | 9/2011 | Jang | G06F 16/29 707/776 |
| 2012/0161984 A1* | 6/2012 | Amir | G01C 21/3685 340/932.2 |
| 2013/0308762 A1* | 11/2013 | Nelson | H04M 3/42348 379/45 |
| 2014/0214472 A1* | 7/2014 | Sewell | G06Q 10/06313 705/7.23 |
| 2015/0325059 A1* | 11/2015 | Mart Nez Alvaro | G07B 15/06 705/13 |
| 2017/0255966 A1* | 9/2017 | Khoury | H04L 67/20 |

(Continued)

*Primary Examiner* — Sze-Hon Kong

(57) ABSTRACT

A user device can receive boundary information that identifies a restricted region; identify one or more map boundaries of the restricted region based on the boundary information; identify traversing roads of the restricted region based on geographic information survey (GIS) information; flag the traversing roads for exclusion from route determination; receive a navigation request identifying at least one of an origin or a destination; determine a route that does not include a flagged traversing road; and provide navigation information identifying the route.

20 Claims, 6 Drawing Sheets

(56) References Cited

U.S. PATENT DOCUMENTS

| | | | |
|---|---|---|---|
| 2017/0262790 A1* | 9/2017 | Khasis | G01C 21/3415 |
| 2017/0307388 A1* | 10/2017 | McConathy | G01C 21/3415 |
| 2018/0025648 A1* | 1/2018 | Zlojutro | G08G 1/0141 |
| | | | 340/935 |
| 2018/0106632 A1* | 4/2018 | Akhtar | G01C 21/3461 |
| 2018/0170349 A1* | 6/2018 | Jobson | B60W 10/06 |
| 2018/0260753 A1* | 9/2018 | Werklund | G06N 5/022 |
| 2019/0120640 A1* | 4/2019 | Ho | G01C 21/3453 |

* cited by examiner

NAVIGATION BASED ON REGIONAL NAVIGATION RESTRICTIONS

BACKGROUND

A user device can provide a navigation application. The navigation application can provide turn-by-turn navigation instructions based on a map, a route, and/or the like. In some implementations, the turn-by-turn navigation instructions can be determined by a backend device, such as a server. For example, the server can use mapping information, route information, and/or the like to determine the navigation instructions.

DETAILED DESCRIPTION OF PREFERRED EMBODIMENTS

The following detailed description of example implementations refers to the accompanying drawings. The same reference numbers in different drawings can identify the same or similar elements.

A user device can provide navigation instructions to navigate from one geographical location (e.g., an origin) to another geographical location (e.g., a destination). For example, the user device can provide the navigation instructions for a user of the user device, for an automated driving system, or for another consumer of such instructions. In some implementations, the user device can be associated with a vehicle. For example, the user device can be associated with a consumer vehicle, a fleet vehicle, and/or the like. The user device can provide navigation instructions for the vehicle to reach one or more destinations. For example, for a fleet vehicle (e.g., a delivery truck, a mail truck, a long-haul truck, a cab, etc.), the navigation instructions can provide instructions from one destination to another until a route of the fleet vehicle is complete.

In some cases, a vehicle might not be permitted in a particular region. For example, some municipalities or governments might impose restrictions or regulations on vehicles (e.g., emissions regulations, safety regulations, engine size regulations, noise regulations, regulations against self-driving cars, etc.). If a fleet vehicle travels through such a region, an operator of the fleet vehicle can be subject to fines or other repercussions. However, some navigation systems might not take into account such regulations or restrictions. For example, a navigation system might not know characteristics of the vehicle associated with the navigation system, and therefore can be blind as to whether the vehicle should be routed around a particular area or region. In such a case, an operator of the navigation system (e.g., a driver of the vehicle) can also use significant resources of the navigation system to route around such an area. For example, the operator can iteratively modify the destinations until a route that does not enter the restricted region is determined.

Some implementations described herein provide navigation information to avoid a restricted region. For example, some implementations described herein can receive information identifying a restricted region, can automatically identify traversing roads that enter or exit the restricted region, and can determine routing information for vehicles that are not to enter the restricted region based on the traversing roads. In this way, implementations described herein can improve fleet compliance with regulations and restrictions, thereby saving organizational resources. Furthermore, implementations described herein can conserve processor and bandwidth resources that would otherwise be used to determine a route that does not enter the restricted region (e.g., based on workarounds or usage of multiple destinations that are located outside the restricted region).

Figure 1A:
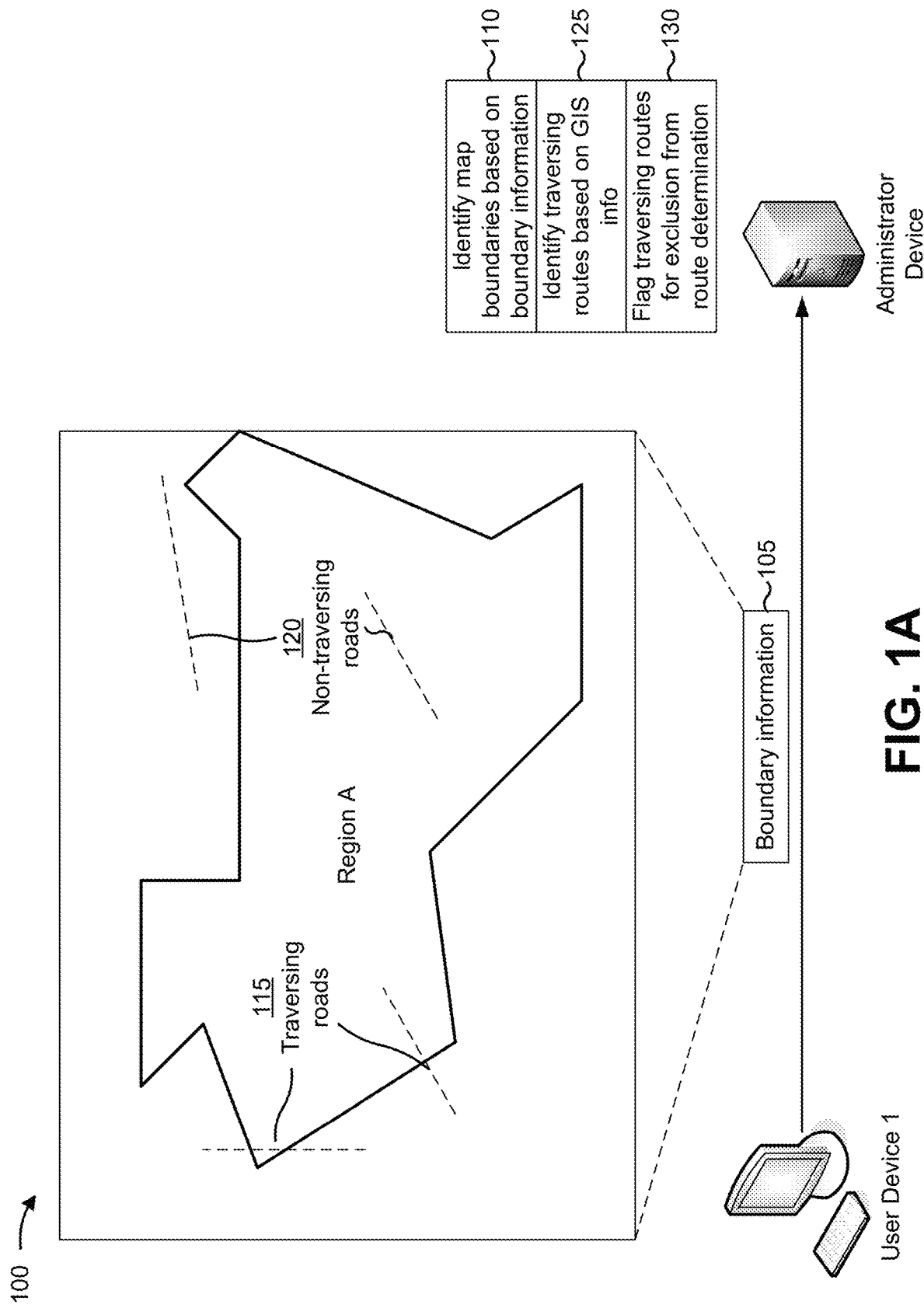
FIGS. 1A and 1B are diagrams of an overview of an example implementation described herein.
Figure 1B:
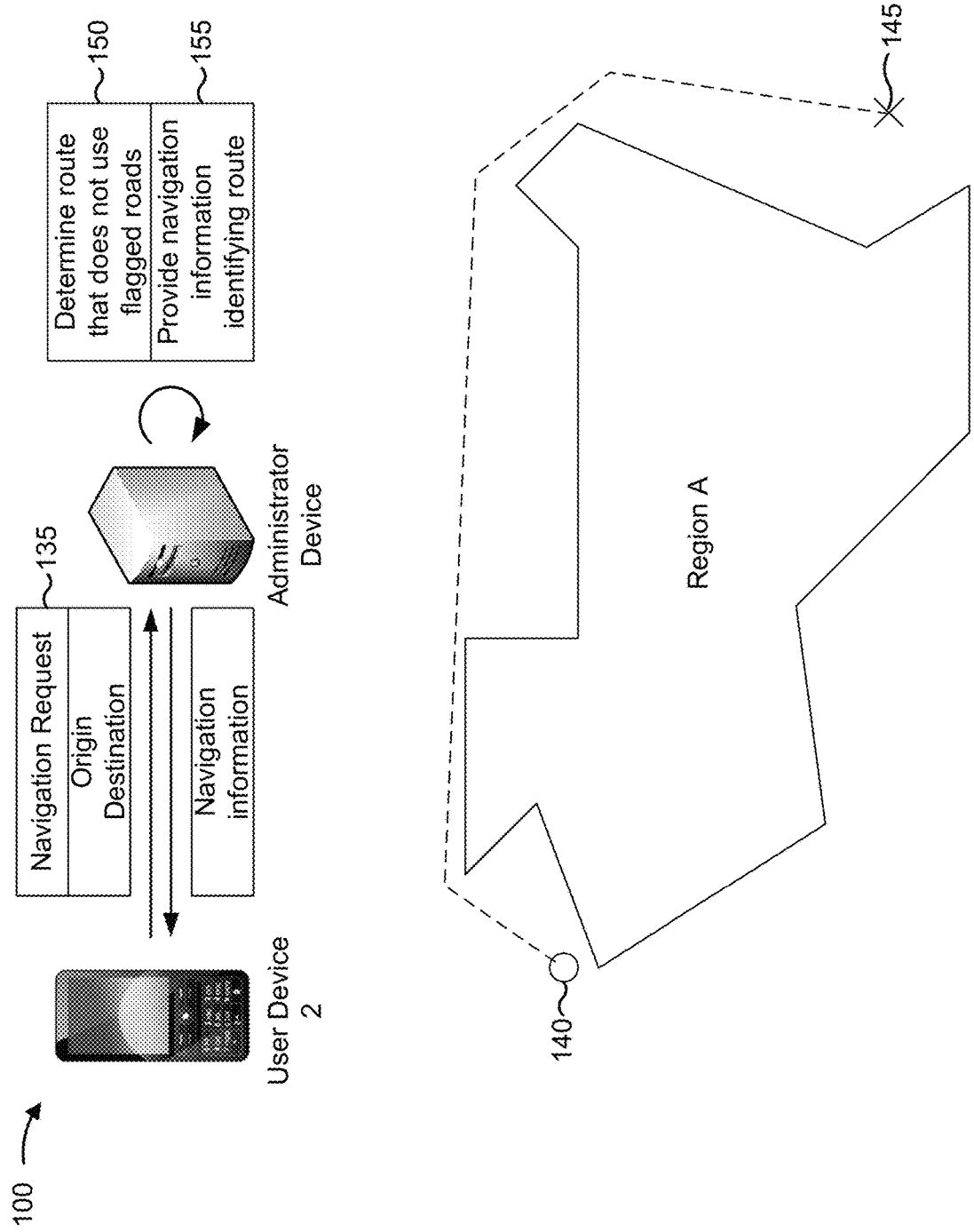

FIGS. 1A and 1B are diagrams of an overview of an example implementation 100 described herein. As shown in FIG. 1A, and by reference number 105, a user device 1 can provide boundary information to an administrator device. As shown, the boundary information can identify a region (e.g., Region A). For example, the boundary information can identify borders of the region (e.g., based on geographical location information). The region can be a region for which a restriction is to be enforced by the administrator device. For example, the administrator device might not route vehicles into the region based on the boundary information. In some implementations, the region can be a municipality, jurisdiction, state, country, and/or the like, although implementations described herein are not limited to those where the region corresponds to such an area.

As shown by reference number 110, the administrator device can identify map boundaries based on the boundary information. A map boundary can correspond to a geographic information system (GIS) information set, as described in more detail below. The map boundaries can be used to identify traversing roads (shown by reference number 115). As used herein, a traversing road is a road that enters or exits a restricted region. A traversing road can be compared with a non-traversing road (shown by reference number 120), which does not enter the region or exit the region.

As shown by reference number 125, the administrator device can identify the traversing roads based on GIS information. For example, the administrator device can identify roads that cross the map boundaries identified in connection with reference number 110, as described in more detail above. As shown by reference number 130, the administrator device can flag the traversing roads for exclusion from route determination. For example, the administrator device, when determining a route for a user device that is to be restricted from Region A, can determine a route that does not include the traversing roads. In this way, the user device can be provided navigation information for a route that does not enter Region A.

As shown in FIG. 1B, and by reference number 135 the administrator device can receive a navigation request from user device 2. For example, user device 2 can be associated with a vehicle that is to navigate from an origin (shown by reference number 140) to a destination (shown by reference number 145) without entering Region A.

As shown by reference number 150, the administrator device can determine a route from the origin to the destination that does not used flagged (i.e., traversing) roads. By identifying a route that does not use traversing roads, the administrator device can ensure that the route provided to user device 2 does not enter Region A. As shown by reference number 155, the administrator device can provide, to user device 2, navigation information identifying the route. User device 2 can provide navigation instructions based on the navigation information. For example, user device 2 can provide turn-by-turn navigation instructions to follow the route from the origin to the destination (not shown).

In this way, regional restrictions can be enforced by determining traversing roads and ensuring that user devices, associated with restricted vehicles, are not routed along the traversing roads. Thus, implementations described herein can conserve processor and bandwidth resources that would otherwise be used to determine a route that does not enter the restricted region (e.g., based on workarounds or usage of multiple destinations that are located outside the restricted region). Furthermore, by tracking and enforcing regional restrictions that can be different for different vehicles, different types of vehicles, and/or the like, implementations described herein use a rigorous approach to perform a technique that would otherwise be unreliably and inefficiently performed by a human actor (e.g., routing of navigation devices based on location restrictions).

As indicated above, FIGS. 1A and 1B are provided merely as an example. Other examples are possible and can differ from what was described with regard to FIGS. 1A and 1B.

Figure 2:
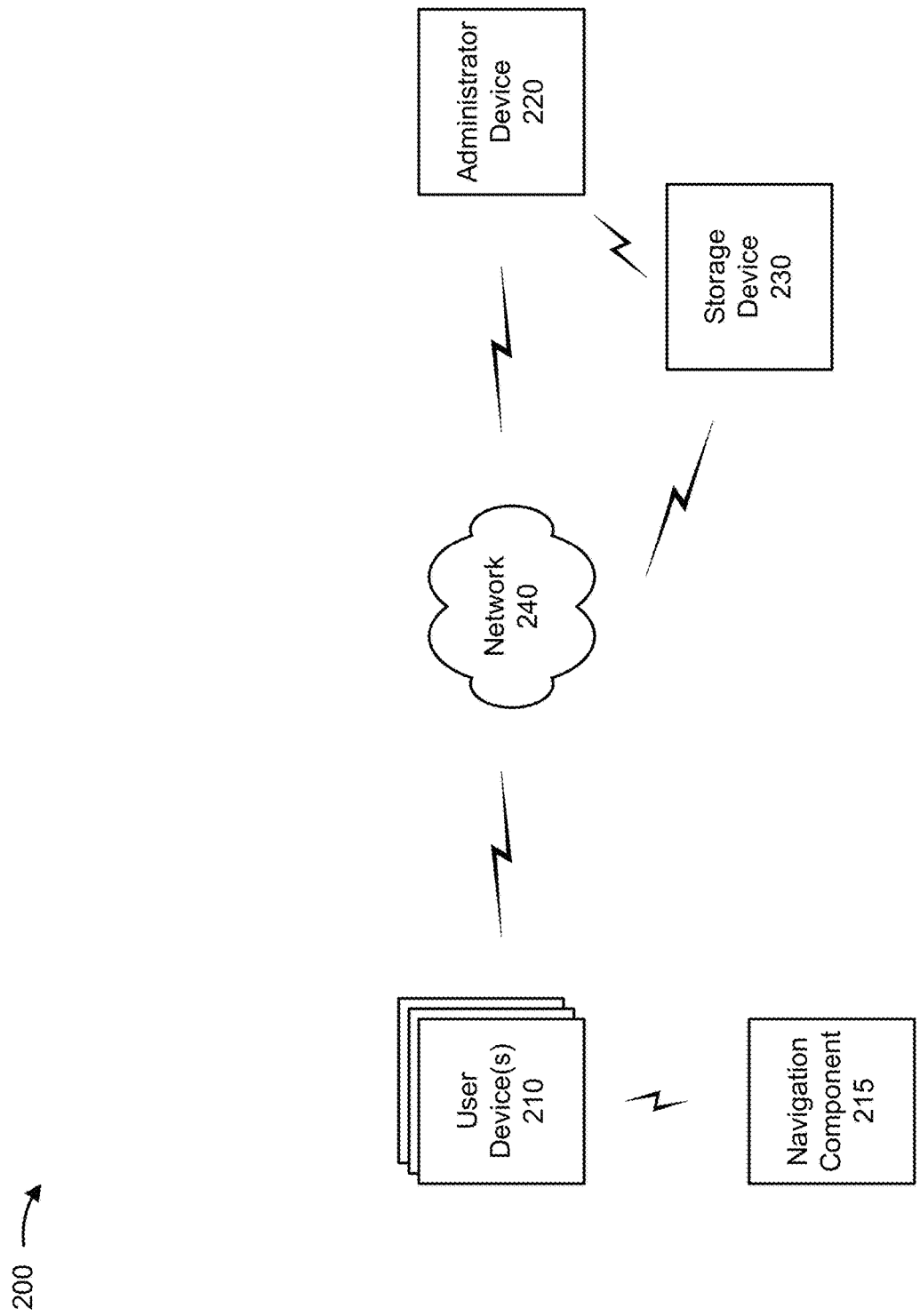
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user devices 210, which can be associated with a navigation component 215. Furthermore, environment 200 can include an administrator device 220, a storage device 230, and a network 240. Devices of environment 200 can interconnect via wired connections, wireless connections, or a combination of wired and wireless connections.

User device 210 includes a device capable of receiving, generating, storing, processing, and/or providing information associated with navigation or routing. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 might not be associated with a user. For example, user device 210 can be associated with an autonomous vehicle and/or the like.

In some implementations, user device 210 can include or be associated with a navigation component 215. Navigation component 215 includes a device capable of receiving, generating, storing, processing, and/or providing information associated with navigation or routing. In some implementations, navigation component 215 can determine and/or provide location information, such as global positioning system (GPS) information, velocity information, speed information, direction of travel information, and/or the like. In some implementations, navigation component 215 can determine and/or provide telemetry information associated with a vehicle associated with user device 210. For example, user device 210 and/or navigation component 215 can be associated with a particular vehicle. In some implementations, navigation component 215 can receive navigation information and can provide the navigation information to user device 210. User device 210 can provide the navigation information (e.g., to a user of user device 210). Additionally, or alternatively, navigation component 215 can receive information from user device 210 (e.g., input regarding a route, input regarding a vehicle, etc.), and can provide the information to administrator device 220.

Administrator device 220 includes one or more devices capable of receiving, generating, storing, processing, and/or providing route information, boundary information, mapping information, geographic information system (GIS) information, and/or the like. For example, administrator device 220 can include a server, a group of servers, and/or the like. In some implementations, administrator device 220 can be implemented in a cloud environment. For example, administrator device 220 can be implemented by one or more computer devices of a cloud computing environment or a data center.

Storage device 230 includes one or more devices capable of receiving, storing, and providing information, such as boundary information, vehicle information, GIS information, and/or the like. For example, storage device 230 can include a server, a group of servers, and/or the like. In some implementations, storage device 230 can be implemented by one or more computer devices of a cloud computing environment or a data center.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
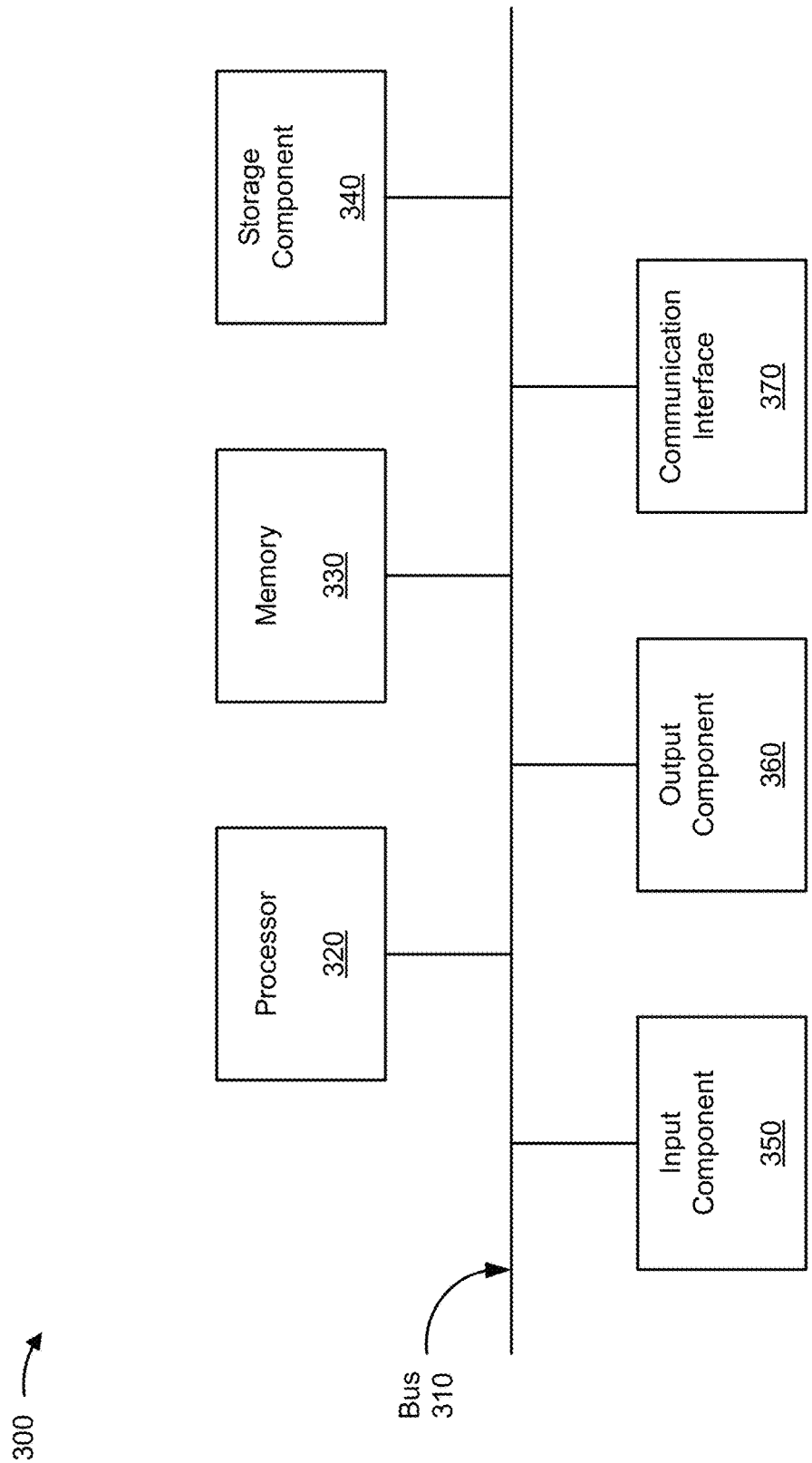
FIG. 3 is a diagram of example components of one or more devices of FIG. 2.

FIG. 3 is a diagram of example components of a device 300. Device 300 can correspond to user device 210, navigation component 215, administrator device 220, and storage device 230. In some implementations user device 210, navigation component 215, administrator device 220, and/or storage device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories, such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
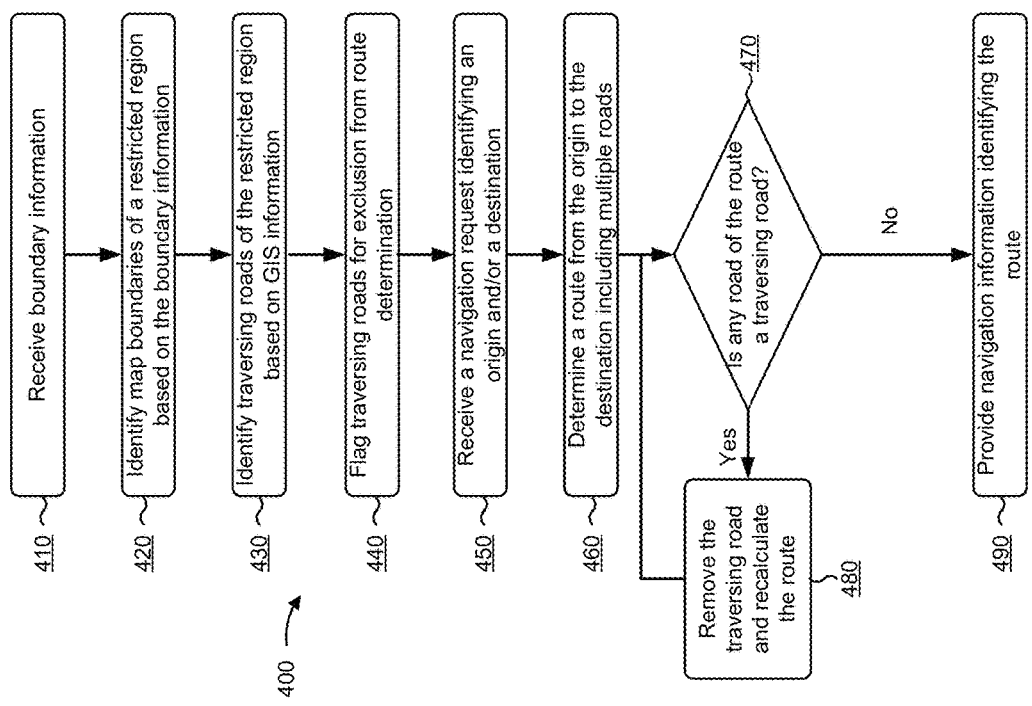
FIG. 4 is a flow chart of an example process for determining navigation information based on a restricted region.

FIG. 4 is a flow chart of an example process 400 for determining navigation information based on a restricted region. In some implementations, one or more process blocks of FIG. 4 can be performed by administrator device 220. In some implementations, one or more process blocks of FIG. 4 can be performed by another device or a group of devices separate from or including administrator device 220, such as user device 210, navigation component 215, and/or storage device 230.

As shown in FIG. 4, process 400 can include receiving boundary information (block 410). For example, administrator device 220 can receive boundary information. In some implementations, administrator device 220 can receive the boundary information from user device 210. For example, administrator device 220 can receive the boundary information from a user device 210 associated with an administrator, or from a user device 210 associated with a vehicle.

The boundary information can identify one or more boundaries of a restricted region. In some implementations, the restricted region can be included in the one or more boundaries. For example, the one or more boundaries can identify outer boundaries of the restricted region. Additionally, or alternatively, the restricted region can be excluded by the one or more boundaries. For example, the one or more boundaries can identify inner boundaries of the restricted region (e.g., a vehicle can be permitted to operate only in the restricted region).

In some implementations, the boundary information can identify or relate to one or more vehicles. For example, the boundary information can be relevant to a particular type of vehicle, can be relevant to vehicles with a particular class of engine, can be relevant to vehicles associated with a particular emissions profile, and/or the like. In such a case, the boundary information can identify the one or more vehicles or the characteristics of the one or more vehicles to which the boundary information relates.

In some implementations, the boundary information can identify physical locations of the one or more boundaries. For example, the boundary information can identify geographical coordinates, metes and bounds, or the like. In some implementations, the boundary information can be based on a municipality, jurisdiction, region, state, country, and/or the like. For example, the boundary information can be defined in relation to or according to a state boundary, a city boundary, a country boundary, a geographical feature (e.g., a river, a bridge, etc.), and/or the like.

As further shown in FIG. 4, process 400 can include identifying map boundaries of a restricted region based on the boundary information (block 420). For example, administrator device 220 can identify map boundaries of a restricted region based on the boundary information. As described herein, a map boundary refers to a boundary, a line, or a demarcation that can be used to identify traversing roads that enter or exit the restricted region. For example, a set of GIS information can relate to a particular parcel or region. When a feature identified by the GIS information reaches a boundary of the particular parcel or region, the feature can be associated with a value (e.g., a pointer, a flag, etc.) that indicates another set of GIS information in which the feature continues. In other words, if a road crosses from a first GIS information set to a second GIS information set, the road can be associated with a value in the first GIS information set that identifies the second GIS information set, and vice versa. The identified map boundaries can correspond to or follow the border between the first GIS information set and the second GIS information set.

As further shown in FIG. 4, process 400 can include identifying traversing roads of the restricted region based on GIS information (block 430). For example, administrator device 220 can identify traversing roads of the restricted region. As described herein, a traversing road is a feature (e.g., a road, highway, expressway, etc.) that enters or exits a restricted region. In other words, a traversing road is a feature that crosses a map boundary of a restricted region. Administrator device 220 can identify traversing roads, as described in more detail below. In some implementations, administrator device 220 can identify each traversing road of the restricted region.

In some implementations, administrator device 220 might not identify non-traversing roads. For example, a non-traversing road is a route that does not enter or exit a restricted region (e.g., that does not cross a map boundary of a restricted region). By identifying traversing roads and not non-traversing roads, processor resources are conserved that would otherwise be used to identify all routes in a restricted region.

In some implementations, administrator device 220 can identify a traversing road based on GIS information associated with the traversing road. For example, administrator device 220 can identify a GIS information set associated with a restricted region. Administrator device 220 can identify each route, of the routes identified by the GIS information set, that is associated with a value identifying a second GIS information set in which the route continues. In other words, administrator device 220 can identify a route that is indicated to be in the restricted region and at least one other region, and can thereby identify the route as a traversing road.

As further shown in FIG. 4, process 400 can include flagging traversing roads for exclusion from route determination (block 440). For example, administrator device 220 can flag the traversing roads that are identified in connection with block 430, above. As used herein "flagging" refers to marking, identifying, or indicating that a particular route is a traversing road. For example, administrator device 220 can store or provide (e.g., to storage device 230) information indicating that a route, identified by the GIS information, is a traversing road. In some implementations, the information indicating that the route is a traversing road can be referred to herein as a flag. For example, administrator device 220 can store or provide a flag indicating that a traversing road is to be excluded from route determination. When a traversing road is excluded from route determination, administrator device 220 can determine navigation information that does not include the traversing road.

In some implementations, the flag can indicate that the traversing road is to be excluded from route determination for a particular vehicle, a particular type of vehicle, and/or the like. For example, the flag can indicate that the traversing road is to be excluded from route determination for vehicles that satisfy an emissions threshold. As another example, the flag can indicate that the traversing road is to be excluded from route determination for vehicles that do not have a particular engine type (e.g., electric, hybrid, etc.). As yet another example, the flag can indicate that the traversing road is to be excluded from route determination for autonomous vehicles. As still another example, the flag can indicate that the traversing road is to be excluded from route determination for vehicles that are not high-occupancy vehicles.

As further shown in FIG. 4, process 400 can include receiving a navigation request identifying an origin and/or a destination (block 450). For example, administrator device 220 can receive a navigation request. In some implementations, administrator device 220 can receive the navigation request from user device 210. For example, user device 210 can provide information identifying an origin and/or a destination. In some implementations, administrator device 220 can receive the navigation request from user device 210 associated with a vehicle. For example, a driver can input information to user device 210 and user device 210 can provide a navigation request based on the inputted information. In some implementations, administrator device 220 can receive the navigation request from another device. For example, administrator device 220 can receive the navigation request from a fleet management device that is determining routes for fleet vehicles, and/or the like.

In some implementations, the navigation request can identify an origin. For example, the origin can be a starting location or a current location of user device 210. In some implementations, the navigation request can identify a destination. For example, the destination can be an ending location to which administrator device 220 is to navigate. In some implementations, administrator device 220 can determine the origin and/or the destination. For example, administrator device 220 can determine the origin and/or the destination based on a default location. Additionally, or alternatively, administrator device 220 can determine the origin and/or the destination based on a route associated with user device 210. For example, user device 210 can be associated with a vehicle that is to travel a particular route. Administrator device 220 can determine the origin and/or the destination based on the particular route.

As further shown in FIG. 4, process 400 can include determining a route from the origin to the destination including multiple roads (block 460). For example, administrator device 220 can determine a route from the origin to the destination. As further shown, administrator device 220 may determine whether any road of the route is a traversing road (block 470). When a road of the route is a traversing road (block 470—YES), then process 400 may include removing the traversing road and recalculating the route (block 480), and returning to block 470. When no road of the route is a traversing road (block 470—NO), process 400 may include providing navigation information identifying the route (block 490). For example, administrator device 220 can determine the route so that the route does not include a traversing road (e.g., a traversing road flagged in connection with block 440, above). For example, administrator device 220 can determine the route so that the route does not include any traversing roads. In this way, administrator device 220 determines a route that does not enter the restricted region by excluding traversing roads from the route determination. Thus, enforcement of regional restrictions using a navigation system is enabled, which conserves processor resources that would otherwise be used to implement resource-intensive workarounds, such as determining a route using multiple destinations that are outside the perimeter of the restricted region.

In some implementations, administrator device 220 can determine the route by identifying a plurality of routes from the origin to the destination. Administrator device 220 can identify one or more routes, of the plurality of routes, that includes a traversing road, and can remove the one or more routes from the plurality of routes. Of the remaining routes, administrator device 220 can select a best route (e.g., based on distance, efficiency, travel time, and/or other factors), and can provide the best route as the determined route.

In some implementations, administrator device 220 can determine the route based on a type of vehicle associated with user device 210. For example, administrator device 220 can store or have access to information that identifies various flags for different routes. As a more particular example, administrator device 220 can have flagged routes as traversing routes for different restricted areas and/or as traversing roads for different types of vehicles. Administrator device 220 can determine a route, that is associated with a particular vehicle type or type of vehicle, that does not include a road flagged as a traversing road for the particular vehicle type or type of vehicle. In this way, administrator device 220 can manage regional restrictions for multiple, different types of vehicles or vehicle types, which can be difficult for a human administrator or operator of such vehicles.

In some implementations, administrator device 220 can determine that an origin of a route is located in the restricted region based on a vehicle associated with user device 210 being located in the restricted region. In such a case, administrator device 220 can route user device 210 out of the restricted region. For example, administrator device 220 can determine a shortest route out of the restricted region. Additionally, or alternatively, administrator device 220 can determine a route to a predetermined location (e.g., a fleet center, a home base, etc.) that is located outside of the restricted region. Additionally, or alternatively, administrator device 220 can change a destination of user device 210 from an original destination to a destination outside the restricted region. In this way, administrator device 220 can determine a route to exit a restricted region, which improves compliance with regional restrictions and conserves organizational resources based on the compliance with the regional restrictions.

In some implementations, the navigation information can identify the route. For example, the navigation information can identify a turn-by-turn route from the origin to the destination. In some implementations, the navigation information can identify one or more traversing roads. For example, the navigation information can provide information indicating traversing roads. In such a case, user device 210 can indicate not to turn onto a traversing road.

In some implementations, user device 210 can provide information relating to the navigation information. For example, user device 210 can provide turn-by-turn navigation instructions based on the navigation information. Additionally, or alternatively, as described above, user device 210 can indicate not to turn onto traversing roads. Additionally, or alternatively, user device 210 can provide a visual indication of the restricted region. For example, administrator device 220 can provide information indicating the map boundaries and/or the restricted region. User device 210 can provide a visual indication of the restricted region. In this way, user device 210 can indicate (e.g., to a driver or operator associated with user device 210) a location of the restricted region.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
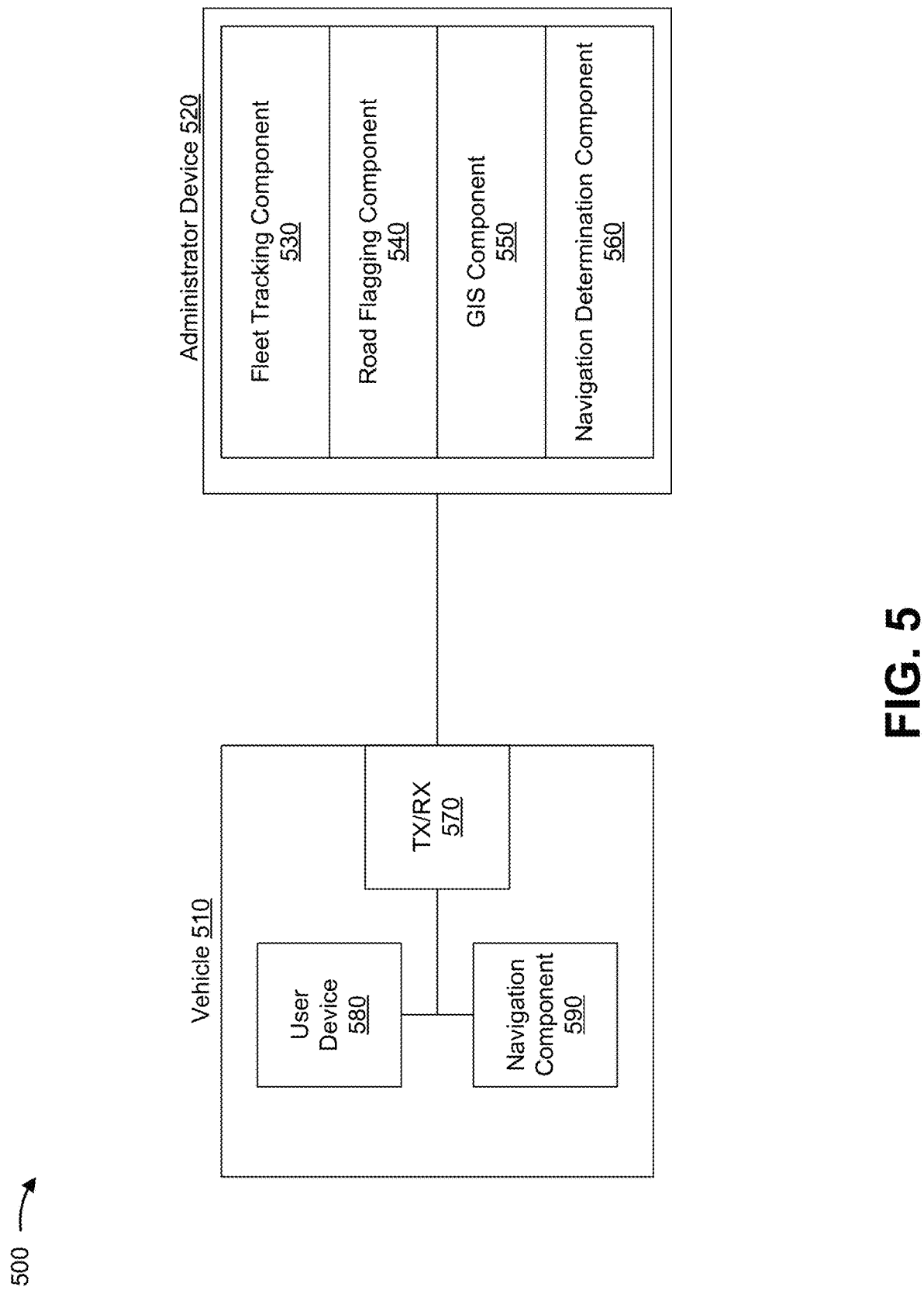
FIG. 5 is a diagram of components of an example system configured to perform the example process shown in FIG. 4.

FIG. 5 is a diagram of components of an example system 500 configured to perform example process 400 shown in FIG. 4. FIG. 5 shows an example of a vehicle 510 in communication with an administrator device 520. For example, the vehicle 510 can include a vehicle for which a route is to be determined. Administrator device 520 can be similar to administrator device 220, described in more detail in connection with FIG. 2, above. As further shown, administrator device 520 can include a fleet tracking component 530, a road flagging component 540, a GIS component 550, and a navigation determination component 560.

Fleet tracking component 530 can track information associated with vehicles 510. For example, fleet tracking component 530 can store and/or provide information identifying locations of vehicles 510, types of vehicles 510, regional restrictions associated with vehicles 510, drivers associated with vehicles 510, and/or the like.

Road flagging component 540 can determine whether a road is a traversing road using information received from GIS component 550. For example, road flagging component 540 can flag roads that are traversing roads according to GIS information received from GIS component 550. In some implementations, road flagging component 540 can flag the roads based on information received from fleet tracking component 530, such as information identifying restricted regions, information identifying a relationship between a restricted region and a vehicle type or type of vehicle, and/or the like.

GIS component 550 can receive, manage, store, and/or provide GIS information. For example, GIS component 550 can provide GIS information identifying roads in particular regions for flagging of traversing roads by road flagging component 540. Additionally, or alternatively, GIS component 550 can provide GIS information for determination of navigation information by navigation determination component 560. In some implementations, GIS component 550 can store information identifying traversing roads. For example, road flagging component 540 can provide information identifying traversing roads (e.g., flagged roads), and GIS component 550 can store this information. In some implementations, GIS component 550 can obtain GIS information stored by another device, such as storage device 230 and/or the like.

Navigation determination component 560 can determine navigation information based on information identifying traversing roads (e.g., received from road flagging component 540) and based on GIS information (e.g., received from GIS component 550). In some implementations, navigation determination component 560 can determine navigation information for a particular vehicle 510 or a particular type of vehicle 510 (e.g., based on information received from fleet tracking component 530).

Administrator device 520 can provide navigation information to vehicle 510. For example, vehicle 510 can include a transmission/reception (TX/RX) component 570. In some implementations, TX/RX component 570 can be a component of user device 580 (e.g., user device 210) and/or navigation component 590 (e.g., navigation component 215).

User device 580 can provide navigation instructions based on the navigation information. For example, user device 580 can provide the navigation instructions to a user or operator of vehicle 510. In some implementations, user device 580 can control vehicle 510 based on the navigation information.

Navigation component 590 can track and/or provide information associated with vehicle 510, such as telemetry, location information, and/or the like. For example, navigation component 590 can provide location information to administrator device 520 for storage by fleet tracking component 530 or another component of administrator device 520.

The number and arrangement of components shown in FIG. 5 are provided as an example. In practice, there can be additional components, fewer components, different components, or differently arranged components than those shown in FIG. 5. Furthermore, two or more components shown in FIG. 5 can be implemented within a single component, or a single component shown in FIG. 5 can be implemented as multiple, distributed components. Additionally, or alternatively, a set of components (e.g., one or more components) shown in FIG. 5 can perform one or more functions described as being performed by another set of components shown in FIG. 5.

In this way, administrator device 220 enforces regional restrictions by determining traversing roads and ensuring that user devices 210, associated with restricted vehicles, are not routed along the traversing roads. Thus, implementations described herein can conserve processor and bandwidth resources that would otherwise be used to determine a route that does not enter the restricted region (e.g., based on workarounds or usage of multiple destinations that are located outside the restricted region). Furthermore, by tracking and enforcing regional restrictions that can be different for different vehicles, different types of vehicles, and/or the like, administrator device 220 uses a rigorous approach to perform a technique that would otherwise be unreliably and inefficiently performed by a human actor (e.g., routing of navigation devices based on location restrictions).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        receive boundary information that identifies a restricted region,
            the boundary information identifying a characteristic of vehicles that are to be restricted from entering the restricted region;
        identify one or more map boundaries of the restricted region based on the boundary information;
        identify traversing roads of the restricted region based on information in a first geographic information system (GIS) information set, associated with a first geographic region, that identifies at least one traversing road, of the traversing roads, that crosses from the first geographic region to a second geographic region associated with a second GIS information set;
        flag the traversing roads for exclusion from route determination,
            the traversing roads being flagged with information indicating that the traversing roads are to be excluded from route determination for vehicles associated with the characteristic, and
            the traversing roads being roads that enter or exit the restricted region;
        receive a navigation request identifying at least one of an origin or a destination,
            the navigation request being associated with a user device for a vehicle having the characteristic;
        determine a route that does not include the traversing roads that are to be excluded from route determination for vehicles associated with the characteristic; and
        provide navigation information identifying the route.

2. The device of claim 1, where the characteristic includes at least one of an emissions threshold, a vehicle type, or an engine type.

3. The device of claim 1, where the restricted region corresponds to a municipality, jurisdiction, city, state, or country.

4. The device of claim 1, where the one or more processors, when determining the route, are to:
    determine the route based on the traversing roads being flagged with the information indicating that the traversing roads are to be excluded from route determination for vehicles associated with the characteristic.

5. The device of claim 1,
where the one or more processors, when identifying the traversing roads, are to:
identify the traversing roads further based on other information, in the first GIS information set, that indicates the traversing roads are associated with the second GIS information set.

6. The device of claim 1, where the one or more processors, when providing the navigation information, are to:
provide, to the user device, information identifying the restricted region and/or the traversing roads,
where the user device is to provide, for display, information identifying the restricted region and/or the traversing roads.

7. The device of claim 1, where the one or more processors, when determining the route, are to:
determine the route to include no traversing road of the restricted region.

8. A non-transitory computer-readable medium storing instructions, the instructions comprising:
one or more instructions that, when executed by one or more processors, cause the one or more processors to:
receive boundary information that identifies a restricted region,
the boundary information identifying a characteristic of vehicles that are to be restricted from entering the restricted region;
identify one or more map boundaries of the restricted region based on the boundary information;
identify traversing roads of the restricted region based on information in a first geographic information system (GIS) information set, associated with a first geographic region, that identifies at least one traversing road, of the traversing roads, that crosses from the first geographic region to a second geographic region associated with a second GIS information set;
flag the traversing roads for exclusion from route determination,
the traversing roads being flagged with information indicating that the traversing roads are to be excluded from route determination for vehicles associated with the characteristic,
the traversing roads being roads that enter or exit the restricted region;
receive a navigation request identifying at least one of an origin or a destination,
the navigation request being associated with a user device for a vehicle having the characteristic;
determine a route that does not include the traversing roads that are to be excluded from route determination for vehicles associated with the characteristic; and
provide navigation information identifying the route.

9. The non-transitory computer-readable medium of claim 8, where the characteristic includes at least one of an emissions threshold, a vehicle type, or an engine type.

10. The non-transitory computer-readable medium of claim 8, where the restricted region corresponds to a municipality, jurisdiction, city, state, or country.

11. The non-transitory computer-readable medium of claim 8, where the one or more instructions, that cause the one or more processors to determine the route, cause the one or more processors to:
determine the route based on the traversing roads being flagged with the information that the traversing roads are to be excluded from route determination for vehicles associated with the characteristic.

12. The non-transitory computer-readable medium of claim 8,
where the one or more instructions, that cause the one or more processors to identify the traversing roads, further cause the one or more processors to:
identify the traversing roads further based on other information, in the first GIS information set, that indicates the traversing roads are associated with the second GIS information set.

13. The non-transitory computer-readable medium of claim 8, where the one or more instructions, that cause the one or more processors to provide the navigation information, cause the one or more processors to:
provide, to the user device, information identifying the restricted region and/or the traversing roads,
where the user device is to provide, for display, information identifying the restricted region and/or the traversing roads.

14. The non-transitory computer-readable medium of claim 8, where the one or more instructions, that cause the one or more processors to determine the route, cause the one or more processors to:
determine the route to include no traversing road of the restricted region.

15. A method, comprising:
receiving, by a device, boundary information that identifies a restricted region,
the boundary information identifying a characteristic of vehicles that are to be restricted from entering the restricted region;
identifying, by the device, one or more map boundaries of the restricted region based on the boundary information;
identifying, by the device, traversing roads of the restricted region based on information in a first geographic information system (GIS) information set, associated with a first geographic region, that identifies at least one traversing road, of the traversing roads, that crosses from the first geographic region to a second geographic region associated with a second GIS information set;
flagging, by the device, the traversing roads for exclusion from route determination,
the traversing roads being flagged with information indicating that the traversing roads are to be excluded from route determination for vehicles associated with the characteristic, and
the traversing roads being roads that enter or exit the restricted region;
receiving, by the device, a navigation request identifying at least one of an origin or a destination,
the navigation request being associated with a user device for a vehicle having the characteristic;
determining, by the device, a route that does not include the traversing roads that are to be excluded from route determination for vehicles associated with the characteristic; and
providing, by the device, navigation information identifying the route.

16. The method of claim 15, where the characteristic includes at least one of an emissions threshold, a vehicle type, or an engine type.

17. The method of claim 15, where the restricted region corresponds to a municipality, jurisdiction, city, state, or country.

18. The method of claim 15, wherein determining the route further comprises:
- determining the route based on the traversing roads being flagged with the information that the traversing roads are to be excluded from route determination for vehicles associated with the characteristic.

19. The method of claim 15,
where identifying the traversing roads further comprises:
- identifying the traversing roads further based on other information, in the first GIS information set, that indicates the traversing roads are associated with the second GIS information set.

20. The method of claim 15, where providing the navigation information further comprises:
- providing information identifying the restricted region and/or the traversing roads to the user device,
- where the user device is to provide, for display, information identifying the restricted region and/or the traversing roads.

* * * * *